US005170036A

United States Patent [19]

Altmann et al.

[11] Patent Number: 5,170,036

[45] Date of Patent: Dec. 8, 1992

[54] RESISTANCE HEATING ARRANGEMENT

[75] Inventors: Dieter Altmann; Eberhard Haupt, both of Gründau, both of Fed. Rep. of Germany

[73] Assignee: I. G. Bauerhin GmbH elektro-technische Fabrik, Grundau-Rothenbergen, Fed. Rep. of Germany

[21] Appl. No.: 684,039

[22] Filed: Apr. 11, 1991

[30] Foreign Application Priority Data

Apr. 21, 1990 [EP] European Pat. Off. ........ 90107603.4

[51] Int. Cl.[5] .......................... H05B 1/00; A47C 7/72

[52] U.S. Cl. .................................... 219/217; 297/180; 219/541

[58] Field of Search ............... 219/202, 212, 217, 541, 219/528; 338/212; 174/DIG. 8; 439/33; 5/421, 284; 297/180

[56] References Cited

U.S. PATENT DOCUMENTS 4,964,674 10/1990 Altmann et al. .................... 219/217

FOREIGN PATENT DOCUMENTS 126162 11/1984 European Pat. Off. .
192155 8/1986 European Pat. Off. .
331762 7/1989 European Pat. Off. .
3505652 8/1986 Fed. Rep. of Germany .
2041047 1/1971 France .
2410412 6/1979 France .

*Primary Examiner*—Bruce A. Reynolds
*Assistant Examiner*—Michael D. Switzer
*Attorney, Agent, or Firm*—Marmorek, Guttman & Rubenstein

[57] ABSTRACT

The instant invention relates to the arrangement of one or several connection layers for an electric resistance heating system installed on the film-laminated inside of covering fabrics, said heating system being sealingly connected by bonded or glued additional films, which is assigned to the seat and/or backrest surface, in particular the construction of seat and backrest elements of vehicle seats. The tension release is installed at a distance from the plane of the heat conductors for the attachment of the connection cable, whereby the distance between the plane of the heat conductors, namely of the covering film and the tension release is set by a blank of foamed material that is made of a formed material or some other elastic material and installed at a predetermined location.

8 Claims, 2 Drawing Sheets

1 2 4 3' 7 6 3' 3' 5 3

2 8 9b 9a 4 7 6 5 3' 3 1

RESISTANCE HEATING ARRANGEMENT

FIELD OF THE INVENTION

The instant invention relates to electric resistance heating, and relates more particularly to an arrangement of one or several connection layers for an electrical resistance heating system attached to the film-laminated inside of cover fabrics and connected in a sealing manner by bonded or glued additional films, installed in the seat and/or backrest surface, particularly of a vehicle seat.

The German patent application P 35 05 652.2 discloses a process for the production of seat heating systems especially well-suited for installation in foam cushion cores because of their high elasticity. Claim 3 of that application explains the utilization of the heating system in seat and backrest cushions made in the swedging process.

In the manufacture of these heated cushion elements, however, the connection between the power supply attached to the covering material and the actual heating system presents difficulties because the maximum tension release is limited to the tear resistance of the foam triangle raised on the side of the connection, and also because the relatively great construction height presents packing problems in practice, namely, when large series are shipped.

The supply circuits themselves can be run with relative ease through appropriate recesses in the form frame. The connection is placed upon the covering fabric and there produces in some cases hard spots as the hardening process progresses, said hard spots being detectable at the seat surface and tending sometimes to breakage.

BRIEF SUMMARY OF THE INVENTION

It is therefore the object of the instant invention to position a blank of foam material supporting a flat thermostat in such manner that the latter cannot be felt at the surface of the covering fabric (which can be made of cushion fabric, leather or artificial leather), cannot become twisted and therefore cannot produce a crossing of heat conductors. Thus only perfect inwardly directed and only slightly distinct contours can be formed in the operation pressing the covering fabric in a vacuum form by a forming ram. During that operation, these contours cannot impede the pressing process, and the safe placement of the blank of foamed material in a predetermined position avoids any collision with the pressing tools.

In this connection it must be ensured that the covering materials provided with the heating system and foamed in a continuously, or semi-continuously, running so-called carousel at pre-programmed intervals, the insertion process of the heated covering fabrics into the individual swedging forms practically does not differentiate itself from the installation of non-heated covering materials; thus, they present no additional expenditure or only so little additional expenditure that they can be produced at the same time within the framework of normal production without any delay in the production process.

The solution of this problem according to the instant invention provides that the foamed-material blanks which are film-laminated on both sides and the plane, that is defined by the position of the heat conductors, serve to guide the connection cable and are arranged to receive the thermostats and also serve for the attachment of the heat conductors on the inside of the plastic-laminated covering fabric of the covering film for the applied heat conductors; furthermore, the distance between the laminated surface inside the covering fabric is set by a foamed-material blank, which is either composed of this foamed material or of some other elastic material and is attached at a predetermined location by its two ends; and that the thus prepared covering is installed with its visible side in close contact with the negative form of the seat or backrest portion; the connection of the connection cables is established by means of a tension relief and a shrink hose, the remaining volume being filled with foamed cushion material.

This design ensures that the blanks of foamed material are installed on an elastic blank of foamed material yet at a suitable distance between the inside of the laminated cover fabric and the heat conductors, it being advantageous for the blank to have the same elastic characteristics as the cushion foam material. This ensures that when the form is filled with foam and during subsequent loading of the cushion element no significantly different stresses can occur and that a sufficient distance is always left to the connections of the heat conductors.

The height of the elastic blanks of foamed material without load measures between 2 and 5 mm. In order to ensure that blanks of foamed material fully occupy the foam material layer of the cushion, they are provided with an area of uniform thickness and size so that these blanks practically do not exert any embossing action and do not mark up the cover fabric.

The blanks of foamed material are coated with, or connected to, a PU-film on both sides.

BRIEF DESCRIPTION OF THE DRAWINGS

The layout of the connection layers, in particular of the elastic foam material blanks for the construction of the seat and backrest elements is explained in further detail by the enclosed schematic drawings of an embodiment, wherein.

DETAILED DESCRIPTION OF THE INVENTION

Figure 1:
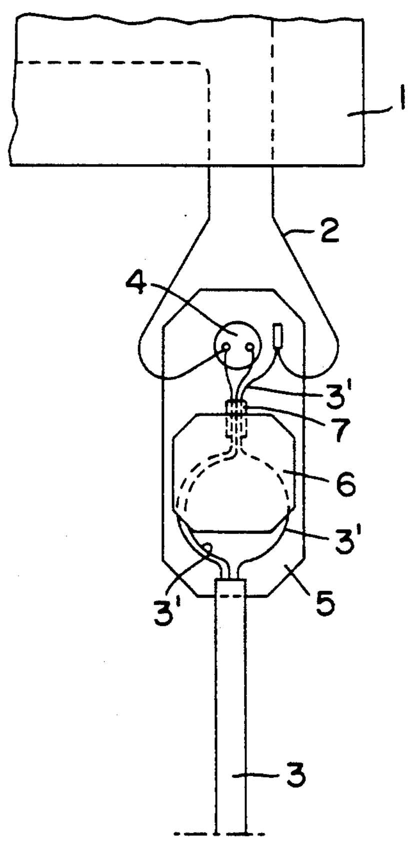
FIG. 1 is a diagrammatic view that shows the design of the seat and backrest surfaces of the heating system and of their connections. For the sake of simplification of the drawing, the heat conductor of the electric resistance heating system as well as the elastic blank of foamed material and the attachment of the different connections are detached by 90° from the inside of the laminated cover fabric—for the sake of a better overview.
Figure 2:
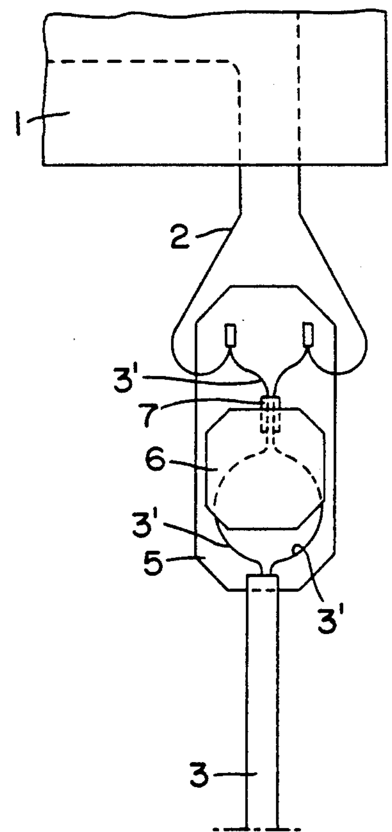
FIG. 2 is a view as FIG. 1, but differs therefrom by the thermostats having been left out, as the thermostat in the seat heating system also controls the backrest surface at the same time. This applies as a general rule; if separate temperature control of the two surfaces is desired, however, a thermostat can easily also be provided in the arrangement shown in FIG. 2.
Figure 3:
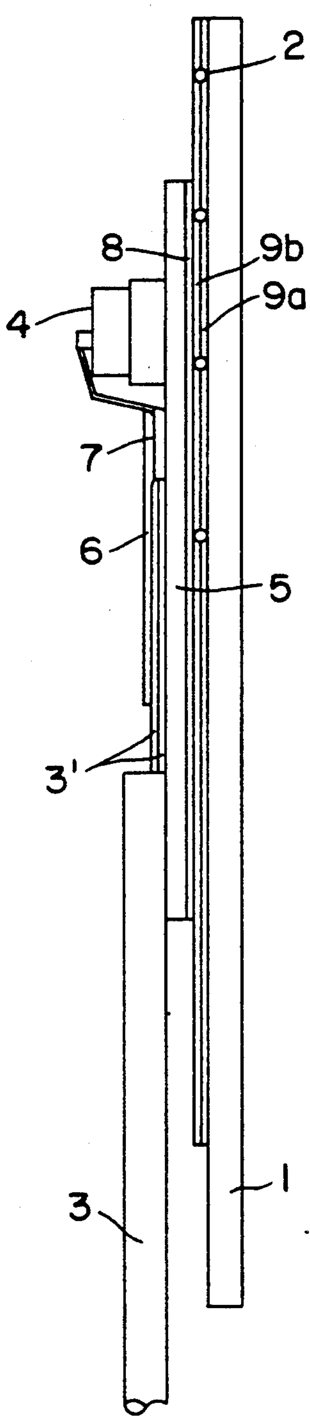
FIG. 3 shows a side elevation of the heating system of FIG. 1.

The heat conductors 2 are secured in their position to the underside of a covering fabric 1 by a covering film 8 (see FIGS. 1–3). The heat conductors are connected in a sealing manner by bonded or glued **9*a* and 9*b***.

The connection cable 3 is connected to the foam-material blank 5. The connections, including the connection of the grounding cable, are distributed on the plane of the foam-material blank 5 approximately in a circle 31 and are brought together in the shrink-hose 7.

To provide for tension release of the foam blank 5, there is provided an additional elastic covering 6. It serves to return the connection cables 3 and blank 5 back into the original annular configuration 3' upon relief.

The heat conductor 2 as well as the enclosed grounding circuit are taken into the shrink-hose 7 as they are brought together, and said shrink-hose 7 assists the return of these cables when the stressed surface is relieved. The heat conductors 2 are connected to a thermostat 4 and the latter is connected to the respective connection cable 3.

We claim:

1. An arrangement of at least one connection layer for an electric resistance heating system installed on a film-laminated underside surface of covering fabrics, said heating system being sealingly connected by at least one additional attached film, said heating system being assigned to seat and backrest surfaces of seat and backrest elements respectively of vehicle seats, said vehicle seat elements having a volume, comprising in combination, heat conductors, at least one plastic-laminated covering fabric, at least one foamed-material blank occupying a portion of the volume of at least one vehicle seat element, and a tension release attached to each foamed-material blank, said heat conductors defining a plane determined by a layout of the heat conductors, said foam-material blank and plane being arranged for receiving a connection cable and thermostats, and for attaching connections of the heat conductors on the underside surface of the plastic-laminated covering fabric, the laminated surface of the covering fabric being separated from said tension release by a distance set by said foamed-material blank, said foamed-material blank comprising an elastic material and attached by both its ends to said laminated surface at a predetermined location, the thus prepared covering fabric being adapted to be installed with its visible side in contact with a negative form of said vehicle seat element, the connection of the connecting cable, including that of a ground circuit, being established by means of said tension release and a shrink hose, and any remaining volume of said vehicle seat element being filled with cushion foam.

2. An arrangement of at least one connection layer as claimed in claim 1, wherein said unloaded blank of foamed material has a thickness between 2 and 5 mm.

3. An arrangement of at least one connection layer as claimed in claim 1, wherein the foamed material blank comprises an area of constant thickness.

4. An arrangement of at least one connection layer as claimed in claim 1, wherein the connections of the heat conductors are so disposed on the inside of the foamed material blank facing the covering fabric on the side of the connection cable, that the connections of the heat conductors remain free of load when traction is exerted on the connection cable.

5. The arrangement of claim 1 wherein said heating system is sealingly connected by at least one additional bonded film.

6. The arrangement of claim 1 wherein said heating system is sealingly connected by at least one additional glued film.

7. The arrangement of claim 1 wherein said foam-material blank comprises a foamed material.

8. A heated vehicle seat comprising:

a covering fabric having a top side and a laminated underside, an electric resistance heating system, sealingly connected by at least one attached film, disposed on said laminated underside of said covering fabric, said heating system comprising a plurality of heating conductors disposed in a plane, a foam blank attached to an underside of said heating system, said foam flank being placed in relation to said plane of heating conductors so as to receive connection cable leads for attachment to said heating conductors, connection cable leads, connecting heating conductors of said heating system to a power cable, disposed on an underside of said foam blank in an arcuate pattern, and a tension release film, comprising an elastic material, disposed on an underside of said foam blank over said electrical conductors, said tension release film being separated form said laminated underside by a distance set by said foam blank so as to provide a tension release for said attachment of said connection cable leads.

* * * * *